US005843270A

United States Patent [19]
Bürgin

[11] Patent Number: 5,843,270
[45] Date of Patent: Dec. 1, 1998

[54] CASSETTE FOR A LABEL PRINTER

[75] Inventor: Markus Bürgin, Uster, Switzerland

[73] Assignee: Pelikan Produktions AG, Egg bei Zurich, Switzerland

[21] Appl. No.: 770,664

[22] Filed: Dec. 20, 1996

[30] Foreign Application Priority Data

Dec. 22, 1995 [DE] Germany ........................ 295 204 21 U

[51] Int. Cl.[6] ........................ B32B 31/00

[52] U.S. Cl. ........................ 156/387; 156/384; 156/540

[58] Field of Search ........................ 156/277, 384, 156/385, 387, 554, 539, 540, 541, 542

[56] References Cited

U.S. PATENT DOCUMENTS

| | | | |
|---|---|---|---|
| 5,193,919 | 3/1993 | Godo et al. | 400/120 |
| 5,203,951 | 4/1993 | Hattori et al. | 156/554 |
| 5,295,753 | 3/1994 | Godo et al. | 400/612 |
| 5,296,084 | 3/1994 | Hattori et al. | 156/554 |

FOREIGN PATENT DOCUMENTS

| | | |
|---|---|---|
| 322918 B1 | 4/1992 | European Pat. Off. . |
| 3411817 A1 | 10/1985 | Germany . |
| 3623820 A1 | 1/1988 | Germany . |
| 8816996 U1 | 10/1991 | Germany . |

OTHER PUBLICATIONS

Patent Abstract of Japan: 4–173381 A, M–1320, Oct. 5, 1992, vol. 16, No. 477.

Patent Abstract of Japan: 6–115234 A., M–1645, Jul. 26, 1994, vol. 18, No. 398.

*Primary Examiner*—James Sells
*Attorney, Agent, or Firm*—Fay, Sharpe, Beall, Fagan, Minnich & McKee

[57] ABSTRACT

The two part cassette for a label printer consists of an adapter 1 and a reload unit 2. The adapter 1 contains a colored tape spool 16, from which the colored tape 19 is pulled off via a re-route device 13. The used tape 19 is wound up on a wind-up core 18. The reload unit 2 contains a spool 42 with a transparent tape 44, which is pulled off and passes across a print head 22 along with the colored tape 19. From another spool 43 in the reload unit 2, a dual-faced adhesive tape 45 is pulled off and adhered by a transport roller 50 onto the printed transparent tape 44. The transparent tape 44 and the adhesive tape 45 exit jointly from an exit slot 48 in the reload unit. This construction facilitates reloading of the adapter 1 with the economically manufacturable and recyclable reload units 2. This construction also affords the option of combining a selection of print colors, adhesive tape colors, and label widths. As a result, the color assortment and width assortment which must be kept in inventory is reduced and the combination of color and width combinations possible are expanded.

12 Claims, 2 Drawing Sheets

CASSETTE FOR A LABEL PRINTER

BACKGROUND OF THE INVENTION

The invention pertains to a cassette for a label printer and more particularly to a two-part cassette which includes an adapter and a detachable tape reload unit.

In known label printer cassettes, supply rolls of a transparent tape and a double-faced adhesive tape, as well as a wind-down core and a wind-up core for a colored tape spool are all rotatably positioned in a single housing. One end of the colored tape is attached to the wind-up core while the other end is wound around the spool. The colored tape and the transparent tape are jointly passed through a printing location, where the transparent tape is inscribed on the reverse side, with the mirror image of the desired final image by a printer. After the printing location, the adhesive tape is glued onto the inscribed side of the transparent tape and these two tapes are jointly transported to an exit slot, where the finished printed labels are cut off. An example of a label printer cassette of this type is shown in EPA-A-332 918.

For the known cassettes of this type, tapes of varying widths are offered. In addition, the adhesive tape is available in several different colors, and the colored printing tape likewise. Thus, the labels can be printed in a large multitude of color combinations between carrier and script. However, in order to provide these multiple color combinations, one must produce a correspondingly large assortment of various types of cassettes and maintain an inventory of these, which requires significant expense.

The currently available cassettes can write approximately 7 to 15 meters before the supply rolls are empty and must be replaced. When the cassette is replaced, the old cassette must be disposed of, which represents an ecological problem, inasmuch as the cassette is made of different materials making recycling difficult.

SUMMARY OF THE INVENTION

The present invention contemplates a new and improved cassette for a label printer which addressed the drawbacks of the known cassettes.

Due to the fact that the supply rolls with the transparent tape and the adhesive tape are contained in one exchangeable reload unit, the few parts which remain after consumption of the tapes, namely the carrier, the transport rolls and the two spool cores can be manufactured from the same material, which facilitates the recycling of these parts. In addition, the colored tape contained in the adapter can be so dimensioned that it will last for approximately 60 meters of writing, so that this adapter needs much less frequent changing.

The same adapters can be used for two or more different widths of the transparent tape and the adhesive tape, and for various colored and varying types of adhesive tapes, so that the assortment of cassettes which has to be kept on hand to achieve a multitude of color combinations is drastically reduced. The specific color combination is chosen in each instance by the user himself, in that he installs a reload unit having the desired tape color and tape width in an adapter with the desired writing color, which results in a significantly greater combination of possibilities for the user.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, wherein.

DETAILED DESCRIPTION OF THE PREFERRED EMBODIMENTS

Figure 1:
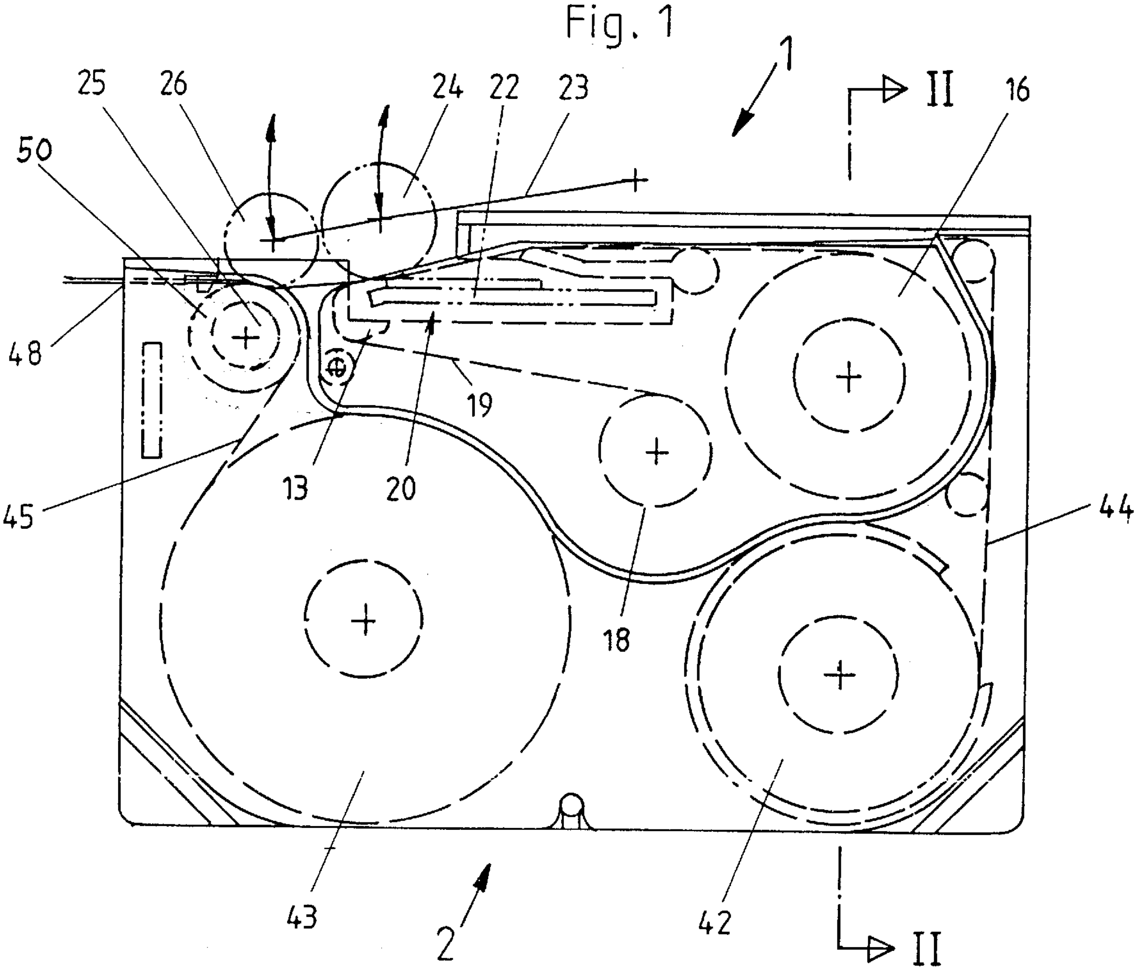
FIG. 1 is a top view of a cassette, including an adapter and a reload unit according to the invention.
Figure 2:
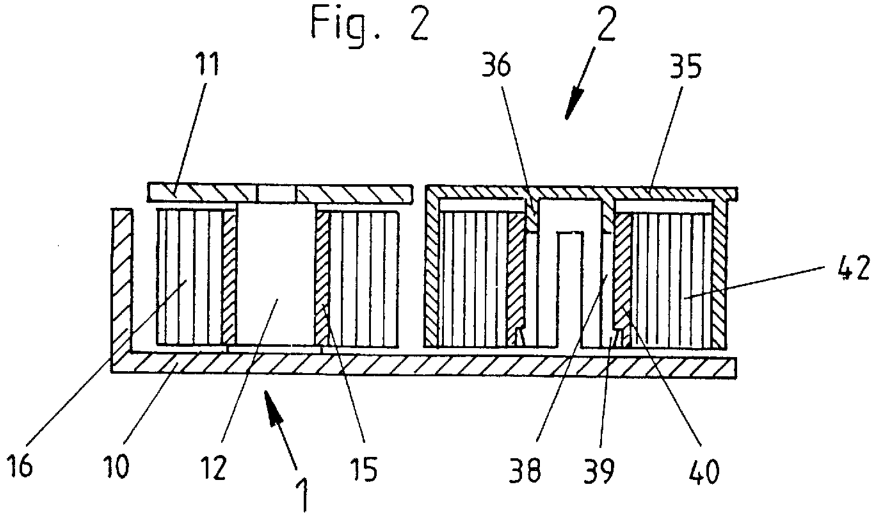
FIG. 2 is a cross sectional view taken along line II—II of FIG. 1.
Figure 3:
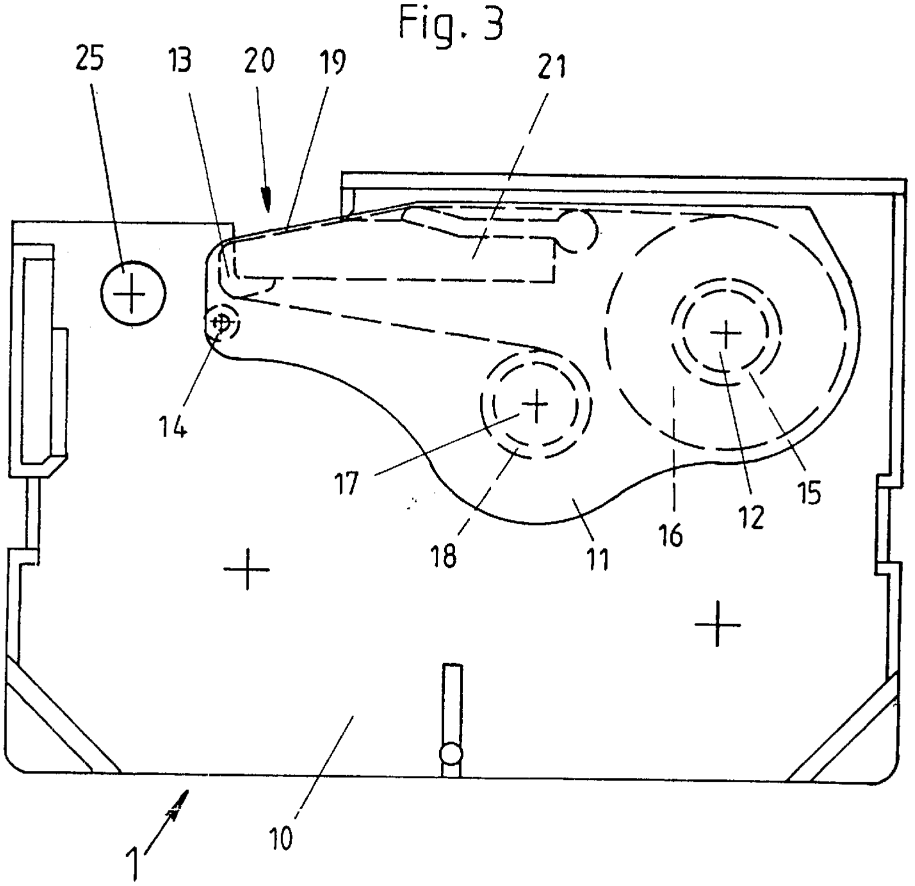
FIG. 3 is a top view of the reload unit of FIG. 1.

Referring now to the drawings wherein the showings are for the purposes of illustrating the preferred embodiment of the invention only and not for purposes of limiting same, the FIGURES show a cassette consisting of an adapter 1 and a detachable reload unit 2 installed in the adapter. As illustrated in FIGS. 2 and 3, the adapter consists of a housing bottom 10 and a cover plate 11. The bottom 10 and the cover plate 11 are connected with each other via a mandrel 12, a tape guidance device 13 and a distance jacket 14. A wind-down core 15 of a colored tape spool for printing is rotatably positioned on the mandrel 12. A wind-up core 18 for the colored tape is rotatably positioned on a post 17. The wind-up core 18 can be actuated through an opening in the lower part 10. The colored tape 19 is conducted from the spool 16 via the tape guidance device 13 to the wind-up core 18 and fastened to the wind-up core. Directly before the tape guidance device 13 there is a printing location 20, which is accessible through an opening 21 in the housing bottom 10 for a print head 22 of a printer indicated by dotted lines in FIG. 1. The colored tape 19 is passed, while in operation, between said print head 22 and a feed roll 24, which is positioned on a swivel arm 23. Down-stream from the printing location 20 there is arranged in the housing bottom 10 an opening 25 for a drive pin of the print head.

Figure 4:
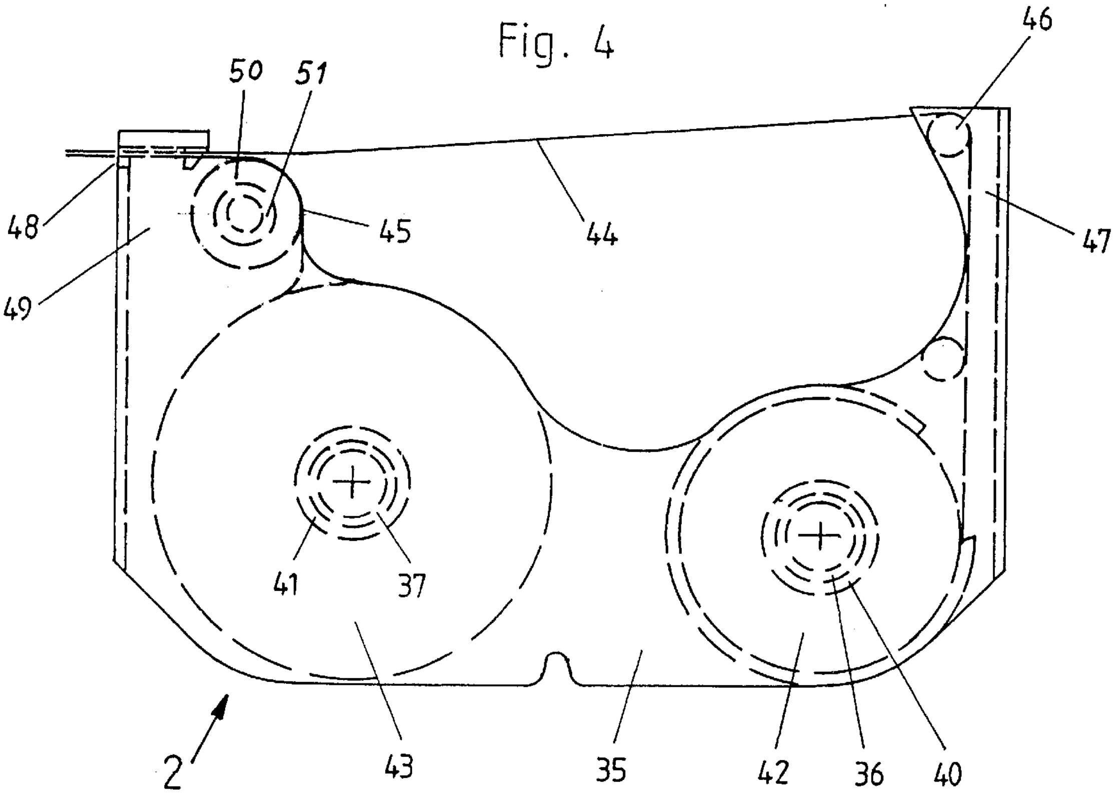
FIG. 4 is a top view of the adapter of FIG. 1.

The reload unit 2 illustrated in FIGS. 2 and 4, fits into the top of the adapter 1 and consists of a carrier 35, from which two hollow posts 36, 37 protrude in a downward direction. The posts 36, 37 each have axial slots 38 extending upwards from a bottom end of the posts.

Resilient tongues are formed between slots 38 with hook-like projections 39 at the lower end of each tongue. The cores 40, 41 of spools 42, 43 of a transparent tape 44 and double-faced adhesive tape 45 are snapped onto the posts 36, 37, and rotatable thereon. The transparent tape 44 is conducted via a re-route device or roller 46 at the free end of an arm 47 of the carrier 35 to an exit slot 48 at a second arm 49 on an opposite side of the carrier. The adhesive tape 45 is conducted via a drive roller 50 to the exit slot 48. The drive roller 50 is snapped onto another hollow post 51 which is formed onto the carrier 35. The post 51 is shorter than the posts 36, 37 and the drive roller 50 has, at the bottom, an out-of-round opening for engagement by the driving pin of the printer. On the side facing away from the transparent tape 44, the adhesive tape 45 has a removable foil coating which is removed to adhere the label to a surface after the label printing process is complete.

The adapter 1 and the reload unit 2 have interacting centering and locking means (not shown) so that the joined together cassette is insertable to the printer as a unit. In the assembled state, the transparent tape 44 runs adjacent to the colored tape 19 between the feed roll 24 and the print head 22. The transparent tape 44 is imprinted by the print head with the color of the colored tape 19. The transparent tape 44 is subsequently glued to the adhesive tape 45 by means of the transport roll 50 and a counter roller 26 on the arm 23. The finished label is discharged via the exit slot 48 and cut off. After consumption of tapes 44, 45, which are of equal length, the reload unit 2 is exchanged for a new reload unit. The reload unit 2 contains only the carrier 35, the two cores 40, 41, and the transport roll 50, all of which are made of similar material, so that the spent reload unit 2 can readily be recycled.

According to an alternative embodiment of the present invention, the drive roller 50 can also be rotatably arranged in the adapter 1 rather than in the reload unit 2. In this embodiment, the adhesive tape 45 is glued to the transparent tape 44 after exiting the cartridge through the exit slot 48. This configuration facilitates effortless installation of the reload unit 2.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A cassette for a label printer comprising:

a lower part including a spool receiving member and a wind-up member;

a colored tape wound around a tape spool and mounted on the spool receiving member with an end of the colored tape attached to the wind-up member;

a removable tape unit received in and removable from the lower part, said removable tape unit comprising a carrier;

a first supply roll of a transparent tape and a second supply roll of an adhesive tape mounted on the carrier;

a recess for accommodating a print head at a print location in the lower part, the colored tape and the transparent tape passing together through the print location;

an exit slot formed on the carrier downstream of the print location, wherein the transparent tape and the adhesive tape pass through the exit slot together; and a transport roll snapped onto a hollow post formed on the carrier.

2. The cassette according to claim 1, wherein the exit slot is formed in the removable tape unit.

3. The cassette according to claim 1 wherein the transport roll is arranged between the printing location and the exit slot over which transparent tape and the adhesive tape are jointly passed.

4. The cassette according to claim 3, wherein the transport roll is arranged in the removable tape unit.

5. A removable tape unit for a cassette according to claim 1 wherein the carrier includes a first core having a first supply roll of the transparent tape rotatably mounted, a second core with a second supply roll of the adhesive tape rotatably mounted, and an arm with an exit slot provided through which the transparent tape and the adhesive tape are jointly passed.

6. The removable tape unit according to claim 5 wherein the transport roll is mounted for transporting and adhering the transparent tape and the adhesive tape.

7. The removable tape unit according to claim 5, wherein the first and second cores are snapped onto hollow posts formed on the carrier.

8. The removable tape unit according to claim 5, wherein the adhesive tape is a dual-faced adhesive tape.

9. A cassette for a label printer comprising:

a first part including a spool of colored tape for printing images and a printing location having an opening for receiving a print head;

a second part including a spool of transparent tape for receiving printed images from the colored tape at the printing location and a spool of adhesive tape for receiving the transparent tape having the printed images thereon; and, wherein the second part is received by and removable from the first part.

10. The cassette according to claim 9, wherein a transport roller is provided on the second part for adhering the transparent tape to the adhesive tape.

11. The cassette according to claim 9 wherein the second part includes an exit slot through which the transparent tape and the adhesive tape pass.

12. A removable tape unit for use in a cassette of a label printer, the removable tape unit comprising:

a first carrier rotatably receiving a roll of transparent tape;

a second carrier rotatably receiving a roll of adhesive tape;

an opening for removably receiving a carrier of a colored tape and a print head for printing on the transparent tape;

a transport roller for adhering the transparent tape having an image printed thereon to the adhesive tape; and, an exit slot through which the transparent tape and the adhesive tape are jointly passed.

* * * * *